Aug. 20, 1946.  W. T. GRAVES, JR., ET AL  2,406,075
FLUID CONTROL DEVICE
Filed June 5, 1944  2 Sheets-Sheet 1

INVENTORS
WILL TOM GRAVES Jr.
THOMAS E. CURTIS
By G. N. Lemmon ATTY.

INVENTORS
WILL TOM GRAVES Jr
THOMAS E. CURTIS
BY G. N. Lemmon ATT'Y.

Patented Aug. 20, 1946

2,406,075

UNITED STATES PATENT OFFICE 2,406,075

FLUID CONTROL DEVICE

Will Tom Graves, Jr., and Thomas E. Curtis, Birmingham, Ala.

Application June 5, 1944, Serial No. 538,858

10 Claims. (Cl. 266—30)

One purpose of this invention is to provide automatic means to control the flow of a fluid through a multiplicity of ducts so that the flow shall be uniform in all ducts even though there may be for one or more ducts variations in the retardation of such flow. Another purpose is to provide an adjustable retarding device for each duct, which is operable to increase the retardation when flow through that duct becomes greater than normal, and to minimize the retardation when the flow is normal or less than normal, and to increase the retardation when the flow in another duct shall become less than normal. Another purpose is to provide an electrical control device which shall be applicable to any use requiring that a multiplicity of devices shall produce results that are uniform with one another even though individual conditions may vary and even though the total of the individual results may vary. Other purposes will be evident from the specification and claims.

One use for the invention is to regulate the airflow from the various tuyères into a blast furnace so that there shall be an approximately uniform flow of air through all tuyères even though conditions within the furnace vary from time to time.

Figure 1:
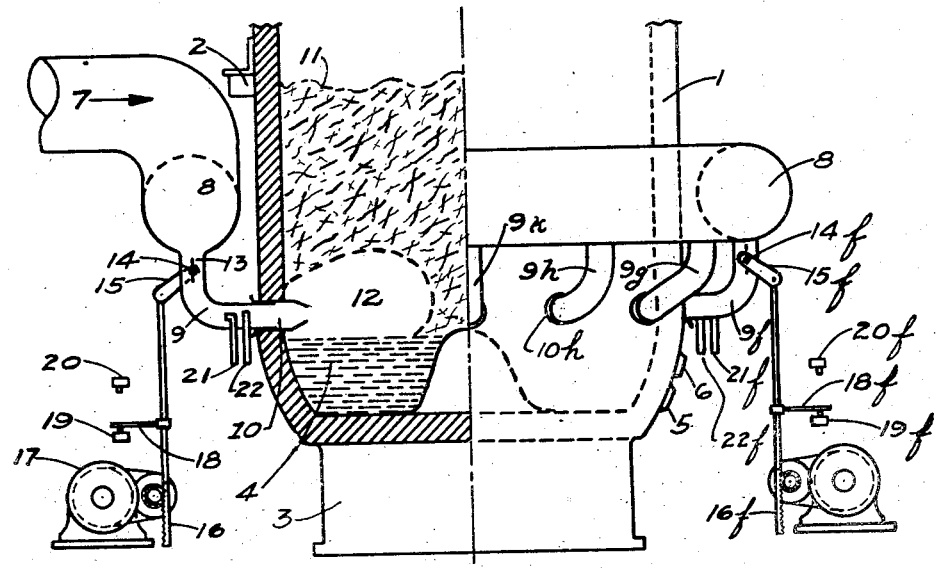
Figure 2:
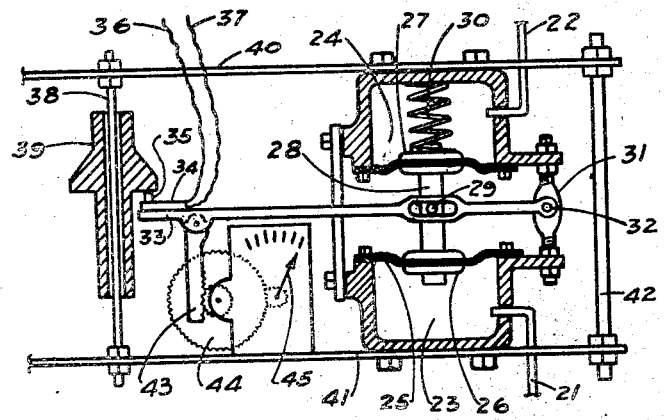
Figure 3:
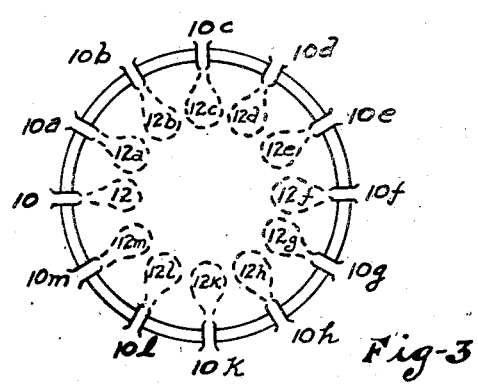
Figure 4:
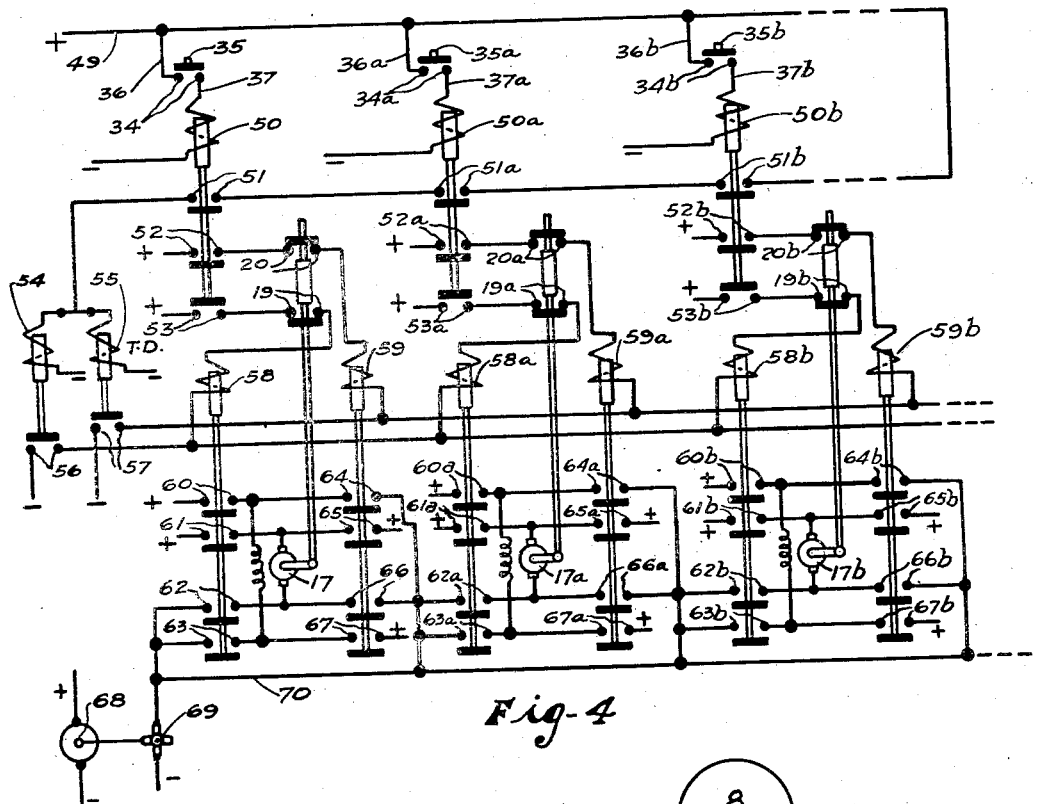
Figure 5:
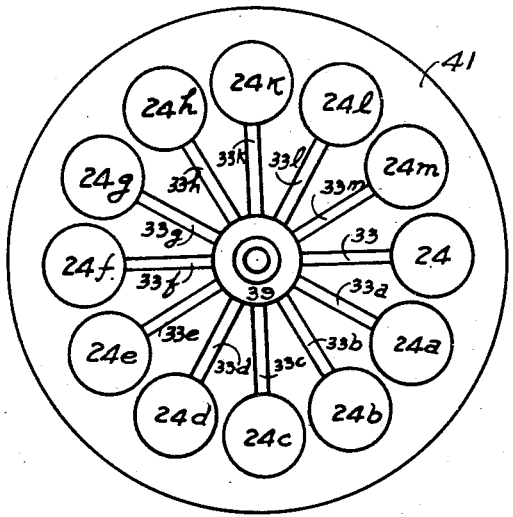
Figure 6:
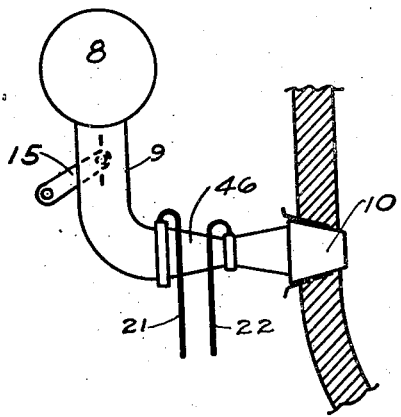

Referring to the drawings, Fig. 1 shows in partial cross section a view of the lower part of a blast furnace; Fig. 2 shows in larger scale a section through part of the control device; Fig. 3 indicates in smaller scale than Fig. 1 the way in which gas-pockets form inside the furnace adjacent to the tuyères; Fig. 4 is a diagram of electrical connections suitable for operating the controls; Fig. 5 indicates in smaller scale than Fig. 2 the general assembly arrangement of the control device; and Fig. 6 shows an alternate method for obtaining indications of the air-flow through a duct.

The main body of the blast-furnace 1 is supported on its foundations 2, 3, and the molten mass of iron and slag 4 is drawn off periodically from the ports 5, 6. A source of heated and compressed air 7 connects with the bustle-pipe 8 which encircles the base of the furnace, and a multiplicity of ducts 9, 9a, 9b–9m conduct the air-flow through the tuyères 10, 10a, 10b–10m into the furnace.

It is assumed that there are 12 ducts and tuyères, all alike, and, for each position, similar items are indicated by the same numeral while the position of the item is indicated by the letter which follows the numeral.

As the compressed air is forced into the furnace it works upward through the burning and melting mass of fuel and ore, 11, which continually works downward during normal operation. The air forms a gas pocket 12, 12a–12m at each tuyère and the compressed air helps to support the mass above it, though the movements of the mass 11 cause constant changes. In the duct 9 is an adjustable barrier such as the valve plate 13 which is supported on the shaft 14 and is rockable by the crank 15, the rack 16 and the geared-down motor 17. An arm 18 moves as crank 15 moves, and 18 acts to open the limit switches at 19 and 20 to prevent over-travel of the crank 15.

In the duct 9 is placed a Pitot tube 21, 22, to provide indications of the air-flow through the duct 9. The tubes are connected to pressure chambers 23, 24. Chamber 23 is closed by a flexible disc 25 which has a solid center 26 which is connected rigidly by rod 28 to the similar solid center 27 of the disc which closes chamber 24. The pin 29, called the operating member, moves up or down when the Pitot tube, in the well known manner, causes variations in the pressures inside chambers 23 and 24. A spring 30 biases center 27 downwardly thereby tending to offset the greater pressure transmitted by tube 21.

On a suitable adjustable support 31 is supported the pin 32 on which is pivoted the arm 33 which engages with pin 29. The arm 33, the housed switch 34, and the pin 35, which operates switch 34, all comprise a separate movable member, and there is a similar separate member associated with each of the ducts 9, 9a–9m. When the pin 35 is pressed down the switch 34 closes and connects together conductors 36 and 37. On a suitable guide 38 a single common member 39 is movable up or down, and it rests on one or on many of the pins 35, 35a–35m which are a part of the said separate members. Two plates 40, 41 are spaced by suitable rods 42 and they support the twelve sets of control members as indicated in Fig. 5.

The rack 43 is movable by arm 33 and it engages through gear train 44 with arm 45. When properly graduated and adjusted, arm 45 will indicate the amount of air-flow through the associated duct 9. This indicating device may be located where convenient, and may be connected with arm 33 in any suitable manner.

In Fig. 6 is shown the way in which a Venturi tube 46 may be used to produce the varying pressures in tubes 21 and 22.

In the diagram in Fig. 4, the source of power 49 is connected through conductors 36, 36a–36m and switches 34, 34a–34m and conductors 37, 37a–37m to solenoids 50, 50a–50m and so to ground.

Solenoids 50, 50a–50m when energized close, respectively, contacts 51, 51a–51m and 52, 52a–52m and open contacts 53, 53a–53m. When all contacts 51, 51a, 51b–51m are closed, solenoids 54 and 55 are energized and thereby contacts 56 and 57 are opened. Associated with solenoids 55 is a time-delay device, TD which causes a time delay to intervene between the deenergizing of solenoid 55 and the closing of contacts 57. But when solenoid 55 is energized contacts 57 are opened instantly.

When contacts 53 are closed and if limit switch 19 is closed, solenoid 58 is energized thereby closing contacts 60, 61, 62, 63, and this will operate motor 17 to move valve device 13 in duct 9 to position of minimum retardation and thereupon to open switch 19. When contacts 52 are closed and if limit switch 20 is closed, this will energize solenoid 59 and, after a time delay, close contacts 64, 65, 66, 67, thereby operating motor 17 so that it moves device 13 to its position of maximum retardation, and limit switch 20 opens.

The connections associated with solenoids 50a, 50b–50m are similar to those described above for solenoid 50, and they function similarly. A small geared-down motor 68 slowly rotates an intermittent circuit maker 69 so that motors 17, 17a–17m, through their common connection 70, operate always in an intermittent manner. This is to prevent over-travel, but this feature may be omitted if desired.

Operation is as follows. Assume that furnace conditions have been normal and all valve plates 13, 13a–13m are in the open, or minimum retardation, position. Since the airflow in all ducts is the same, the pins 35, 35a–35m, of all separate members, are helping to support the common member 39, and all switches 34, 34a, 34b–34m are closed. Therefore all coils 50, 50a–50m are energized and all contacts 51, 51a–51m are closed, so that coils 54 and 55 are energized and no motor 17, 17a–17m can be operated, since 56 and 57 are open. Now assume that at tuyère 10 the mass 11 changes and partially blocks the discharge of air from tuyère 10 into the furnace at 12. The decreased air flow will reduce the pressure in tube 21 and in chamber 23, whereupon spring 30 forces operating member 29 lower and so the separate member, which comprises arm 32, switch 34 and pin 35, is lowered away from common member 39, and switch 34 is allowed to open. This causes switch 51 to open, deenergizing coils 54 and 55 and closing contacts 56. Since contacts 53 were closed by the deenergizing of solenoid 50, coil 58 is energized and motor 17 is operated to move valve plate 13 to open position, unless it were already there. In a pre-determined time interval after coil 55 was deenergized, contacts 57 will close. Since contacts 51a, 51b–51m are already closed, all solenoids 59a, 59b–59m will be energized thereby operating all motors 17a, 17b—17m so that they start moving valve plates 13a, 13b–13m toward their retardation, or closed, positions. It should be noted that valve plates 13 do not fully close their respective ducts even when in position of maximum retardation.

The closing of valve plates in any one of the ducts 9a, 9b–9m tends to reduce the flow of air in those ducts; but it is customary for the air compressors to force a uniform amount of air into the furnace, and so the compressors immediately build up in bustle-pipe 8 a higher pressure, which overcomes the partial retardation of valve plates 13a, 13b–13m, so that air-flow in these ducts again becomes normal. This increased pressure applied to duct 9, with valve plate 13 in open position, will tend to increase the pressure inside the area 12 and thereby overcome the greater retardation opposed to the air-flow from tuyère 10, making the air-flow in 9 again normal. When air-flow in 9 equals that in 9a, 9b–9m, lever 33 will be raised towards 39, thereby closing contacts 34 and stopping the operation of all motors 17a, 17b–17m, through the action of solenoids 56 and 57.

After the same volume of air at its increased pressure has burned away the unusual obstruction near tuyère 10, the air-flow in 10 will increase above normal. Thereupon the pressure in chamber 23 will lift operating member 29 and its associated separate member above the normal position. This will cause pin 35 to lift common member 39 up so that it is above the other separate members, and therefore all contacts 34a, 34b–34m will be allowed to open. This will again deenergize solenoids 54 and 55, thereby energizing solenoids 58a, 58b–58m so that all motors 17a, 17b–17m operate and move their respective retarding devices to the open, or unretarding positions. If this does not act to reduce the air-flow in duct 9 to normal, then after the pre-determined interval, contacts 57 will be closed and motor 17 will be energized to move valve plate 13 towards its closed position.

Similarly, if the furnace mass 11 should move so as to allow more than normal air-flow through duct 9, the controls would cause motor 17 to close valve plate 13 until the air-flow in 9 was lowered to normal. Since all tuyères and their controls are alike, operations as described above can take place in many groupings. Thus if air-flow is low in two ducts, both valve plates 13 will remain at, or be moved to, open positions; and then the 10 other motors will move their valve plates towards closed position. As air-flow in each of these ducts becomes normal, its switch 34 (or 34a–34m) will be closed and the respective motor will stop. Likewise if two or more motors are moving their valve plates 13 towards open position, each motor will be stopped as soon as normal air-flow is established in its respective duct thereby causing the closing of the corresponding switch 34 or 34a–34m.

If it should be desirable to increase the total amount of air-flow into the furnace, the compressors will be so operated. Assuming that conditions at all tuyères are alike, the increased pressure in bustle-pipe 8 will cause an equal increase of air-flow in all ducts 9, 9a–9m. Therefore all separate members will act together to raise common member 39 to the position which corresponds to the increased air-flow. A decrease in total air-flow will cause all separate members and the common member 39 to be lowered simultaneously, with no operation of any motors 17, 17a–17m.

Without departing from the purpose and spirit of this invention many changes may be made by one familiar with similar equipment. It is obvious that the features of this invention can be used in other ways than for the control of air-flow into a blast furnace. The drawings and specification show one use for the invention and one set of apparatus by which it may be applied to this use, but the claims are not limited to the specific features and details as shown.

We claim:

1. In combination with a blast furnace, a multiplicity of ducts conducting compressed air from a common source into the furnace, a motor-operated air-controlling device associated with each duct, automatic control means responsive to variations of air-flow through each duct and operable to cause energization of the motors to regulate the air-flow in all ducts, together with means to interrupt the said energization of the motors at regular predetermined intervals.

2. In a blast furnace, in combination, a multiplicity of ducts to conduct air blasts into the furnace, a variable retarding device associated with each duct, automatic means to operate the said retarding devices to regulate the air-flow in all ducts, and an indicator to show the present amount of air-flow in each duct.

3. In combination in an electrical control device, a multiplicity of operating members each movable in response to the varying conditions imposed upon it, a movable common member, a multiplicity of separate movable members and an electric switch associated with each said separate member, the said common member being biased towards the said separate members; each of said separate members being movable by one of said operating members into engagement with said common member, thereby to oppose the bias of said common member and also to operate the respective associated electric switch.

4. In combination in an electrical control device, a multiplicity of operating members each movable in response to the varying conditions imposed upon it, a multiplicity of movable separate members, an electric switch coordinated with each of said separate members, a movable common member biased towards the said separate members and with its bias counterbalanced by pressure from one or more of said separate members, each of said separate members being movable by one of said operating members into and out of close association with the said common member, thereby to operate the said switch coordinated with said separate member.

5. In an electrical control device, a biased and movable common member, a multiplicity of separate members, an electric switch associated with each of said separate members, each said separate member being operable into and out of close association with said common member to operate its respective switch, together with means to cause the current flow through each said switch to be intermittent.

6. In a blast furnace, in combination, a multiplicity of ducts conducting air into the furnace, a variable retarding device associated with each duct, a motor to operate each said device, a common movable member, a switch to control each said motor operable in response to variations of air flow in its associated duct, and each said switch being also operable by changes in the relative positions of the said switch and the said common member.

7. In combination, a pressure system for a fluid comprising a source and a multiplicity of duct outlets therefrom, a control device in each of said outlets operable to retard or to facilitate the flow of fluid therethrough, a motor to operate each of said control devices, together with automatic regulating means operable under conditions of uniform flow in all outlets to move every control device to its facilitating position and to leave all motors deenergized.

8. In combination, a pressure system for a fluid comprising a source and a multiplicity of duct outlets therefrom, a control device operable to retard or to facilitate the flow of fluid in each of said outlets, an electric motor to operate each control device, a multiplicity of pressure chambers connected respectively with the said outlets, an electric switch operable by variations of pressure within its respective pressure chamber to control its respective motor, the said switch being disposed outside of said pressure chamber.

9. In combination, a pressure system for a fluid comprising a source and a multiplicity of duct outlets therefrom, a control device in each of said outlets operable to retard or to facilitate the flow of fluid therethrough, an electric motor to operate each of said control devices, a multiplicity of pressure chambers connected respectively with the said outlets, together with an automatic electrical control system responsive to variations of pressures within the said pressure chambers but disposed entirely outside of said pressure chambers and operable to maintain a relatively uniform flow of fluid through all of said outlets.

10. In combination, a pressure system for a fluid comprising a source and a multiplicity of duct outlets therefrom, a control device operable to retard or to facilitate the flow of fluid in each of said outlets, an electric motor to operate each control device and an electric switch to control each motor, two pressure chambers connected with each said outlet, an operating member exterior to the said chambers and movable in response to variations of pressures within the said chambers, the said electric switch being operable by movement of the said operating member.

WILL TOM GRAVES, Jr.
THOMAS E. CURTIS.